B. E. GETCHELL & O. O. SMITH.
INTEGRATING WATTMETER.
APPLICATION FILED FEB. 26, 1908.
911,036.
Patented Feb. 2, 1909.
3 SHEETS—SHEET 1.
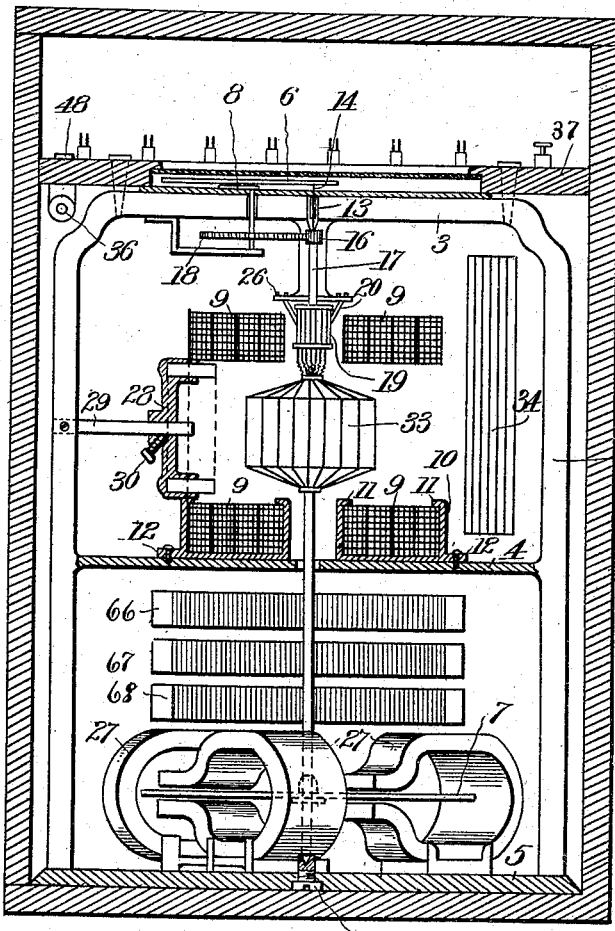
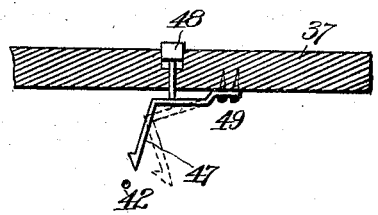
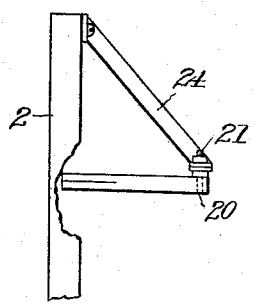
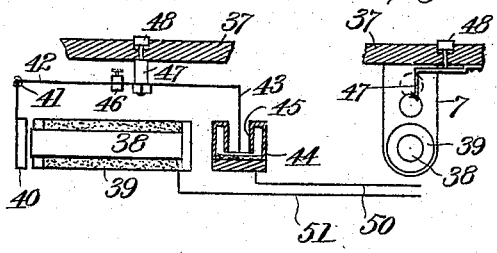
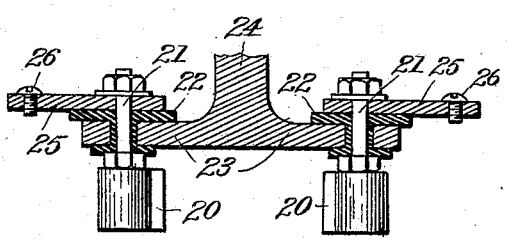
Witnesses
C. H. Walker
L. E. Fischer
Inventors
Benjamin E. Getchell
Oscar O. Smith
By E. E. Vrooman,
their Attorney.

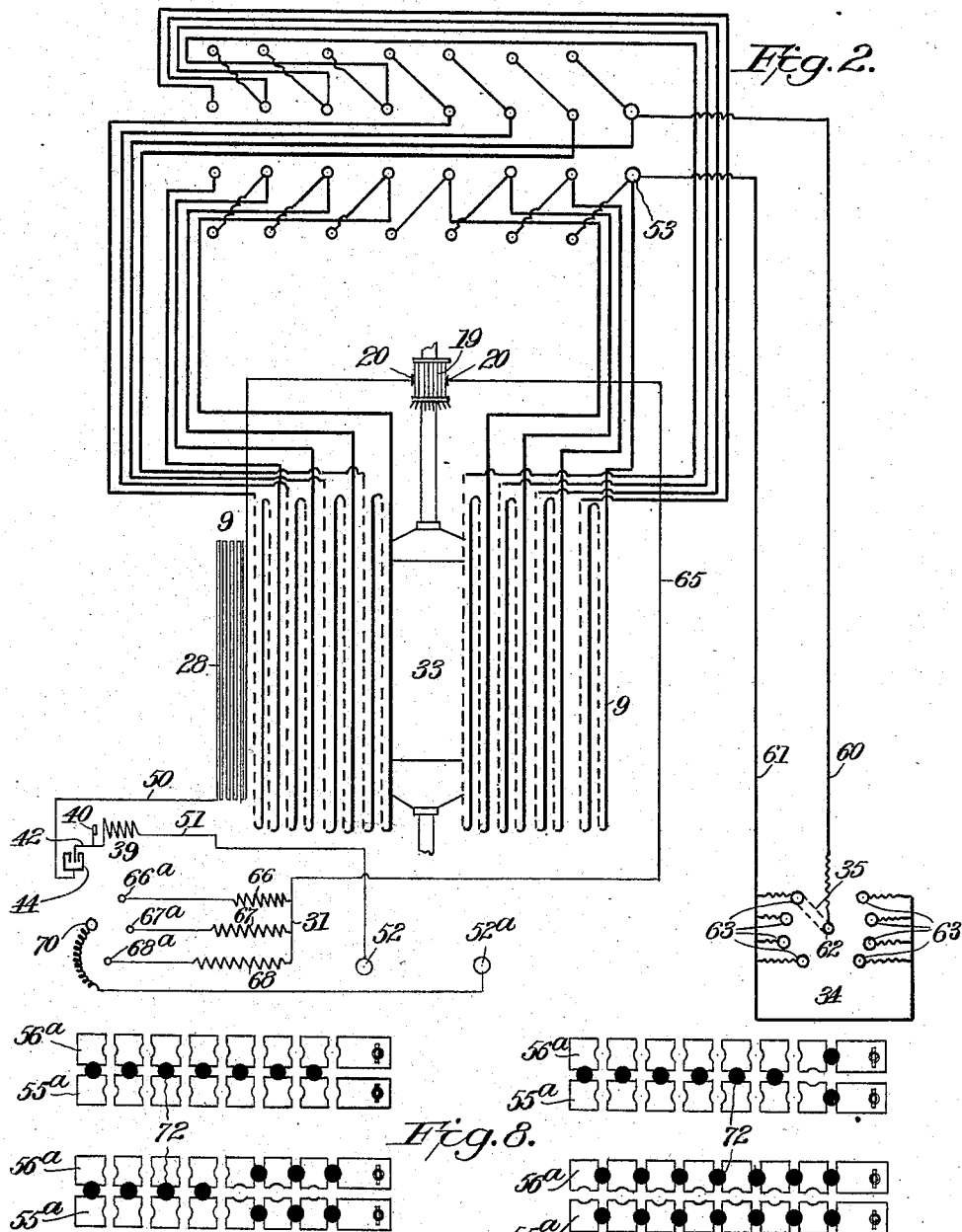

B. E. GETCHELL & O. O. SMITH.
INTEGRATING WATTMETER.
APPLICATION FILED FEB. 26, 1908.
911,036.
Patented Feb. 2, 1909.
3 SHEETS—SHEET 3.
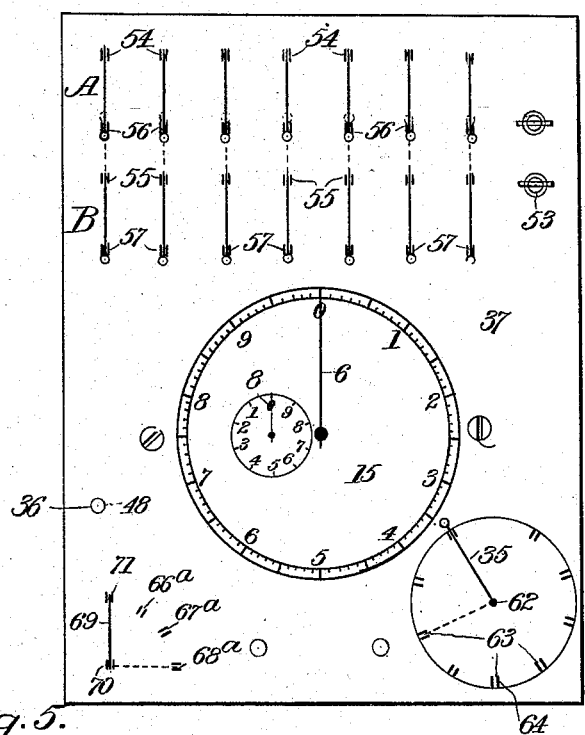
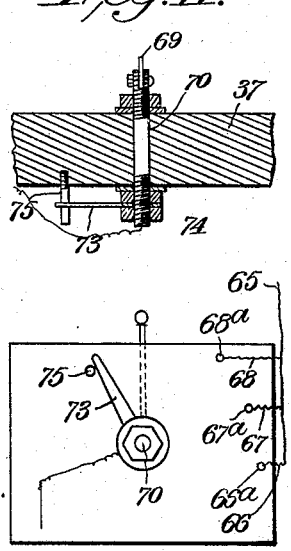
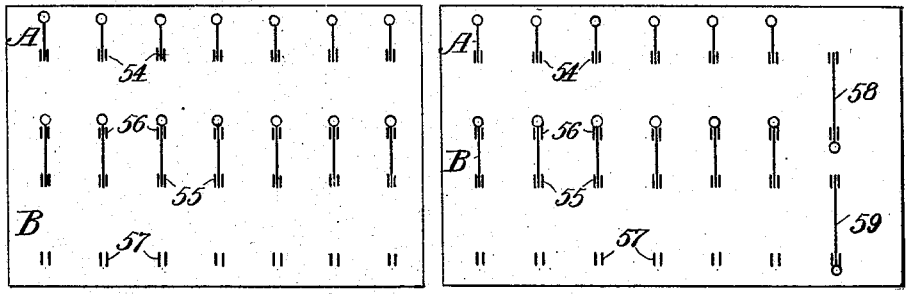
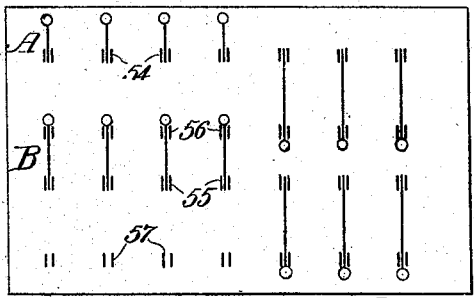

UNITED STATES PATENT OFFICE.

BENJAMIN E. GETCHELL AND OSCAR O. SMITH, OF CONNELLSVILLE, PENNSYLVANIA.

INTEGRATING-WATTMETER.

No. 911,036.  Specification of Letters Patent.  Patented Feb. 2, 1909.

Application filed February 26, 1908. Serial No. 417,979.

*To all whom it may concern:*

Be it known that I, BENJAMIN E. GETCHELL and OSCAR O. SMITH, citizens of the United States, residing at Connellsville, in the county of Fayette and State of Pennsylvania, have invented certain new and useful Improvements in Integrating - Wattmeters, of which the following is a specification, reference being had therein to the accompanying drawing.

This invention relates to an improvement in wattmeters, and particularly to the application of an improved commutator - type meter provided with a dial and hands for indicating complete and hundredth parts of revolutions of the disk, for use as a standard for testing meters in service.

In our invention, we employ sectionally-wound field-coils, and an exceedingly simple switch combination, by means of which the meter can be readily set for any of its rated capacities, which may be five amperes, ten amperes, twenty amperes, and forty amperes; or our apparatus may be built for any multiple thereof; potential capacity,—one hundred volts, two hundred volts, and five hundred volts.

Our apparatus may be used on both direct current and alternating current of any frequency without readjusting calibration.

Errors in reading due to a difference in phase between the current in the field and armature circuits are overcome by means of the apparatus hereinafter specifically described. Furthermore, danger of burning out meter by careless operation is rendered impossible by a specially constructed relay. The torque of our meter is one hundred seventy gram millimeters at full load, making it as reliable to hold its accuracy as any other meter known to the prior art.

The meter or apparatus hereinafter described has a range covering four different current capacities, and three or more different potential capacities, both direct and alternating current of any frequency, and covers all integrating meters from one ampere to two thousand ampere capacity used by any electrical lighting or power plant.

With these and other objects in view, the invention consists of certain novel constructions, combination, and arrangements of parts, as will be hereinafter fully described and claimed.

In the drawings: Figure 1 is a fragmentary, vertical, sectional view of a meter or apparatus constructed in accordance with the present invention. Fig. 2 is a diagram of the current and potential circuits. Fig. 3 is a top plan view of the meter, showing particularly the dial and switches. Fig. 4 is a view in side elevation, and shown partly in section, of the relay for preventing the potential winding from being burned out by careless operation. Fig. 4$^a$ is a view of the catch-device, illustrated in Fig. 4. Fig. 4$^b$ is a fragmentary view of the relay depicted in Fig. 4. Figs. 5, 6, and 7 are plan views of the switches, the terminals of which are connected to the sections in the fields. Fig. 8 is a plan view of plug connections similar to the switches depicted in Figs. 5 to 7. Fig. 9 is a fragmentary, sectional view of the supporting-bracket and brushes, which brushes engage the commutator. Fig. 10 is a fragmentary view of an apparatus, showing particularly the brush-supporting bracket in side elevation. Fig. 11 is a fragmentary view of the apparatus, showing particularly the pivot switch for the resistance of potential circuit and for the adjustable resistance connected in shunt to the field coils. Fig. 12 is an inverted, plan view of the bottom of the switch depicted in Fig. 11.

Referring particularly to Fig. 1, 1 designates the carrying-case, in which the supporting-frame 2 is positioned. The frame 2 carries the electrical and mechanical devices employed in constructing our meter. The frame 2 is provided with a horizontal top-portion 3 and an intermediate, horizontal supporting portion 4 and rests upon a base portion 5. The pointer 6 indicates fractional parts of revolutions of the disk 7, and the auxiliary pointer 8 indicates the total revolutions of the disk 7. The sectionally-wound fields 9 are supported in any suitable manner, preferably, upon the intermediate portion 4 and within the frame or auxiliary casing 2. The lower fields are partly surrounded by a casing 10, which has flattened upper edge 11, and is provided with an outwardly-extending flange 12, through which suitable fastening means, as for instance, screws, pass, and are threaded into portion 4, Fig. 1. A bearing 13 is secured, in any suitable manner, upon the frame 2, and this bearing constitutes an upper guiding means, through which passes the upper end of the vertical shaft 14, carrying the primary pointer or hand 6. The dial 15 is provided, at its outer edge, with a graduated scale, designating the tenths and hundredths of revolutions of disk 7, Fig. 1, see Fig. 3. A pinion 16 is mounted upon the armature-shaft 17, of which 14 is the upper end; said pinion rotates the gear-wheel 18. The wheel 18 is fixedly secured to a shaft carrying, at its upper end, the auxiliary pointer 8, so that the pointers 6 and 8 will synchronously register. On the armature-shaft 17, there is secured a commutator 19, which is engaged by the brushes 20, Fig. 9. Each brush 20 is supported upon a detachable, vertical shaft 21, which is suitably insulated, as at 22, from the flat horizontal portion 23 of the brush-supporting bracket 24. The screws 26 constitute binding-posts for attaching terminals thereto. The retarding and controlling magnets 27 are fastened to the base-portion 5 of the frame 2, Fig. 1. The disk 7 rotates between the magnets 27.

The adjustable field-coil 28 is slidably adjustable upon a fixed, horizontal shaft or extension 29, and said field-coil can be fixedly secured in an adjusted position through the medium of set-screw 30; the inner end of the set-screw being adapted to clamp or engage the horizontal bracket or shaft 29. This field-coil controls light load speed.

The resistances 66, 67, 68, in the potential circuit are, preferably, of a capacity of one hundred volts, two hundred volts, and five hundred volts, and are arranged inside of the frame 2, and, preferably, below the sectional fields 9 and above the magnets 27; see Fig. 2 of this structure.

The armature-shaft 17 is journaled in a jewel or bearing 32, at its lower end, and said shaft carries armature 33, which is fixedly secured thereto; the armature 33 being secured between the fields 9.

For the purpose of adjusting the phase of the current in the series field coils 9 and bringing the same into phase with the current in the armature circuit on non-inductive load, we provide an adjustable non-inductive resistance 34, to be connected in shunt to said field coils and controlled by switch 35.

In Fig. 1, the relay-device 36 is shown attached to the top-portion 37, which, while fitting snug within the case 1, is lifted out of the same when the frame 2 is removed. The relay-device 36 will be specifically described hereinafter. The top-portion 37 is fastened to the top-portion 3 of frame 2, by any suitable fastening means, and said top-portion 37 carries the terminals and switches, Fig. 3.

The relay employed for preventing the burning out of potential circuit by careless operation, comprises an iron core 38, magnetized by a winding 39 of low resistance in series with potential circuit. The armature 40 is pivoted upon any suitable support, at 41, and fixedly secured to the armature, at 41, is a metallic arm 42, the outer end of which is bent, preferably, at right-angles and extends downwardly, as at 43, into a receptacle 44. This receptacle 44 is, preferably, constructed of iron, and is provided with a bottom and sides, and with a partly overhanging top and with a depending hollow extension 45, which prevents the mercury contained therein from spilling out when the meter is turned over; the vertical end portion 43 of the arm 42 works in the hollow portion 45, and engages the mercury in the cup. An adjustable weight 46 is slidably mounted upon the arm 42, and is secured in its adjusted position by a set-screw. This weight 46 is adjusted, so that the armature 40 will not draw up to the magnet 38 on proper potential adjustments, but if a high potential is passed through the low potential winding, the increased current strengthens magnet 38, and thus, overcomes leverage of counterweight 46, and will throw arm 42 upward, breaking the circuit at the mercury cup, and said arm will be hooked or clutched by the spring-catch 47, which spring-catch can be actuated by means of the vertically-movable push-button 48, which is provided with a plunger extending through the top-portion 37. The arm 42, and especially its vertical portion 43, together with the cup or receptacle 44, is, preferably, constructed of iron to prevent the action of mercury which takes place on other metals. This entire relay of our improved apparatus is constructed, so as to occupy but very little space, and as before mentioned, is supported from the underside of the top-portion 37, and consequently, when the top-portion 37 and the frame 2 is removed, the relay is also lifted out of the case 1. It is to be noted that the spring catch 47 is provided with a horizontal body portion terminating at one end in an inclined, vertical portion, and at its opposite end in an upwardly-bent and horizontal portion, through which horizontal portion, any suitable fastening means, as for instance, screws 49, pass, for fixedly securing the end of the catch to the top-portion 37. The hooked portion at the lower end of the vertical portion of the catch will easily ride over the arm 42, and secure the same in its raised position, when the armature is in engagement with the end of the core 38. The wires 50 and 51 constitute part of the potential circuit, and upon referring to Fig. 2, it will be seen that the wire 50 leads to the adjustable field coil 28, and the wire 51 leads to the terminal 52.

Referring particularly to Figs. 2 and 3, it is to be noted that the current enters at the terminal 53, and passes through the fields according to the position of the switches shown in Fig. 3. In said Fig. 3, there are shown two rows of single-pole knife-switches A, B; the row A being pivoted at the alined terminals 54, whereas the row of switches B are pivoted at the alined row of terminals 55. The switches of row A may only engage the terminals or points 56, which points are arranged in alinement the same as the rows of points or terminals 54 and 55. The switches of row B may be thrown upon either side, and, consequently, engage either points or terminals 56 or 57. Of course, if the switches of row B are engaging points or terminals of row 56, the switches of row A can not be closed, thus making erroneous switching difficult, if not impossible. Four different circuit capacities are possible with this combination, as follows: We will describe the plans in terms of twenty-five, fifty, one hundred, and two hundred amperes, although, of course, our invention covers any multiple of capacity mentioned. For a twenty-five ampere capacity, the switches should be positioned, as shown in Fig. 5. This connecting of rows of terminals 55 and 56, by means of the row of switches B, puts all the fields 9 in series. Each of the four sections in each field 9 has ten turns of copper wire capable of carrying forty amperes, but constructed for twenty-five amperes. This gives two hundred fifty ampere-turns in each section 9 at full load, or two thousand ampere-turns in double field of eight sections. For a fifty ampere capacity, the switches should be placed in the position illustrated in Fig. 6, and thus it will be seen that two terminals of sections are put in multiple at start by closing switch 59 into one of the terminals of row 57, and are finished in multiple, after passing through entire field in multiple, by closing switch 59 into one of the terminals or points of row 56. Thus, we have two sections always parallel with each other throughout the entire circuit or field, reducing the total number of turns to one-half, but the current is double giving two thousand ampere-turns, the same as at first. This results in the same field at fifty amperes with fifty ampere adjustment, as on twenty-five amperes with twenty-five ampere adjustment. For a one hundred ampere capacity, the switches may be positioned as illustrated in Fig. 7, in which four terminals of sections are put in multiple at start and finished in multiple. Thus, turns are reduced to one-fourth, but current being four times as great, the ampere-turns are still two thousand. For two hundred amperes, all of the sections are in multiple, as in Fig. 3, reducing turns to one-eighth, but the current is eight times as great, resulting in two thousand ampere turns. As before mentioned, this may be worked out on the same principle for any desired capacity.

Adjustment of the phase of the field current on alternating current tests: The leads 60 and 61 are connected to the adjustable non-inductive resistance 34, and the lead 60 of the circuit is connected, at one end to the terminal 62, Fig. 2; the terminal 62 is provided with the pivoted switch 35. The lead 61 is connected, through the resistance, to the terminals 63, and either one of these terminals 63 may be engaged by the switch 35. The position of the switch 35 is determined according to the capacity for which the meter is adjusted. Inasmuch as no phase adjustment is required in direct-current tests, the shunt circuit through the resistance 34 is left open by placing the switch-arm 35 in the position indicated by point 64 in Fig. 3.

The potential winding is connected to terminals 52 and $52^a$. From 52 it passes directly to the relay, hereinbefore described, and, thence, through the medium of the wire 50, to the adjustable shunt field-coil 28, which regulates the light-load speed by being adjusted upon the horizontal bracket 28, Fig. 1, relative to the armature 33. From the shunt field-coil 28, it passes to brush 20 on the left-hand side of the commutator, and then through the commutator 19, passing out at the brush 20 on the right-hand side of the commutator. Then the current passes through the wire 65 to the common connection 31 of the resistance-coils 66, 67, and 68, Fig. 2. The resistance is determined by the position of the pivoted switch arm 69, Fig. 3, which is pivoted to the terminal 70, and said switch arm 69 may be thrown into contact either with the point 71, which is open, or with the points $66^a$, $67^a$, or $68^a$, which have a resistance suitable for one hundred, two hundred, or five hundred volts respectively, according to circuit upon which the meter is to be used. Each resistance is adjusted, so that upon its voltage, the same amount of current will pass through the armature. This results in the armature carrying the same number of ampere-turns at one hundred volts, two hundred volts, or five hundred volts, with resistance adjusted accordingly.

In Fig. 8, we have shown a modified form of the means for closing the terminals or points 54, 56, 55, and 57, Fig. 3, which comprises the terminals $56^a$, and $55^a$; the plugs 72 being shown in substantially the same position as the blade switches in Figs. 5 to 7 and in Fig. 3 for closing the circuit at the terminals for obtaining any multiple of capacity, as hereinbefore fully described. It will be noted that we have disclosed two means for closing the circuit at the terminals of the sections of the fields, whereby the terminals of one section may be electrically connected with the terminal of another section.

In Figs. 11 and 12, we have illustrated the terminals of a pivoted switch suitable for use with the resistance of potential circuit and with the adjustable non-inductive resistance 34, as provided with a pointer or fixed finger 73, which is clamped upon the lower end of the terminal or point 70, by means of nuts 74. Secured to the underface of the top portion 37 is a depending pin or stud 75, which limits the rotary movement of the pointer or finger 73, and prevents the continuous rotation of the switch, thereby obviating the possibility of the leadwire from being twisted off of the lower end of the terminal 70, as said wire is, preferably, soldered to the end thereof. It is to be noted that we have provided a terminal 70, constituted by the rotatable member, which is provided, at its upper end, with a bifurcated portion, in which the switch 69 is pivotally mounted, and at its lower end with a threaded portion, upon which the clamping nuts 74 are positioned, which nuts fixedly secure the finger or pointer 74 upon the terminal member 70.

What we claim is:

1. In an electric meter, the combination with an element influenced by the potential of the system, means for varying the resistance of the potential circuit, means for automatically opening the potential circuit upon a predetermined increase in the potential thereof and means for varying the limits upon which said automatic action occurs.

2. In an electric meter, the combination with an element influenced by the potential of the system, means for varying the resistance of the potential circuit, means for automatically opening the potential circuit upon a predetermined increase in the potential thereof, means for varying the limits upon which said automatic opening occurs, and manual means for restoring the circuit through the potential circuit.

3. In an electric meter adapted to operate upon different voltages and having a capacity for widely different currents, the combination with the pressure coil, of an auxiliary pressure coil adjustable with relation thereto, a variable resistance in circuit with said coils, a series winding having a plurality of sections, means for connecting said sections in different relations to vary the current-carrying capacity thereof while maintaining the ampere-turns substantially constant, and variable means connected in shunt to said series coils for controlling the phase of the current therein when operating upon alternating current.

4. In an electric meter adapted to operate upon alternating current circuits having different voltages and different frequencies, the combination with the pressure coil, of an adjustable resistance in circuit therewith, a series winding having a plurality of leads connected to different portions thereof, means coöperating with the said leads for varying the current-carrying capacity of the winding and maintaining the ampere turns substantially constant, and means for adjusting the phase of the current in the series coil with relation to the current in the pressure winding comprising an adjustable resistance connected in shunt to said series winding.

5. In an electric meter adapted to operate upon alternating current circuits of different frequencies and adapted to widely different currents, the combination with the pressure coil, of a variable resistance in circuit therewith, a series winding having a plurality of sections, means for connecting said sections in different relations to vary the current-carrying capacity thereof but maintain the ampere-turns substantially constant, and means for changing the phase of the current in the series winding comprising a variable resistance connected in shunt to the series winding.

In testimony whereof we hereunto affix our signatures in presence of two witnesses.

BENJAMIN E. GETCHELL.
OSCAR O. SMITH.

Witnesses:
H. A. ASSENAT,
HELEN LOOMIS.